US011206172B2

(12) United States Patent
Gerodolle et al.

(10) Patent No.: US 11,206,172 B2
(45) Date of Patent: Dec. 21, 2021

(54) METHOD FOR ESTABLISHING A MANAGEMENT SESSION BETWEEN AN ITEM OF EQUIPMENT AND A DEVICE FOR MANAGEMENT OF THIS ITEM OF EQUIPMENT

(71) Applicant: ORANGE, Paris (FR)

(72) Inventors: Anne Gerodolle, Eybens (FR); Olivier Beyler, Echirolles (FR); Marc Douet, Voreppe (FR)

(73) Assignee: Orange, Paris (FR)

(*) Notice: Subject to any disclaimer, the term of this patent is extended or adjusted under 35 U.S.C. 154(b) by 89 days.

(21) Appl. No.: 16/087,572

(22) PCT Filed: Mar. 9, 2017

(86) PCT No.: PCT/FR2017/050532
§ 371 (c)(1),
(2) Date: Sep. 21, 2018

(87) PCT Pub. No.: WO2017/168068
PCT Pub. Date: Oct. 5, 2017

(65) Prior Publication Data
US 2019/0116081 A1    Apr. 18, 2019

(30) Foreign Application Priority Data
Mar. 30, 2016   (FR) ...................................... 1652736

(51) Int. Cl.
*G06F 15/177*    (2006.01)
*H04L 12/24*    (2006.01)
(Continued)

(52) U.S. Cl.
CPC ...... *H04L 41/0253* (2013.01); *H04L 41/0806* (2013.01); *H04L 61/2514* (2013.01);
(Continued)

(58) Field of Classification Search
CPC .... H04W 84/12; H04W 4/70; H04L 63/0428; H04L 41/0213; H04L 41/0806
See application file for complete search history.

(56) References Cited

U.S. PATENT DOCUMENTS

2013/0128729 A1* 5/2013 Nair ...................... H04L 41/069
370/229
2013/0311656 A1* 11/2013 Liekens ................ H04L 41/046
709/224

(Continued)

FOREIGN PATENT DOCUMENTS

WO    2010076488 A1    7/2010

OTHER PUBLICATIONS

TR-069 CPE WAN Management Protocol, Issue 1, Amendment 5, Issue Date Nov. 2013, CWMP Version 1.4, broadband-forum.org/download/TR-069_Amendment-5.pdf.*

(Continued)

*Primary Examiner* — Brian Whipple
*Assistant Examiner* — Gregory P Tolchinsky
(74) *Attorney, Agent, or Firm* — Haverstock & Owens LLP (57) ABSTRACT

The invention provides a set-up method for setting up a management session between a first piece of equipment of a first network and a first management device for managing this piece of equipment that belongs to a second network, the method comprising:
setting up (F70) a management session between a second piece of equipment of the first network that is reachable from the second network, and a second management device managing the second piece of equipment that belongs to the second network;
the second management device acting during the management session to send (F80) a request to the second piece of equipment requesting the second piece of
(Continued)

equipment to download a content at an address provided by the first piece of equipment in order to set up a management session therewith;
the second piece of equipment executing (F110) the download request; and
in response to this execution, the first piece of equipment initiating (F170) a connection with the first management device to set up a management session therewith.

10 Claims, 2 Drawing Sheets

(51) Int. Cl.
*H04L 29/08* (2006.01)
*H04L 29/12* (2006.01)
*H04L 29/06* (2006.01)

(52) U.S. Cl.
CPC .......... *H04L 61/2575* (2013.01); *H04L 63/08* (2013.01); *H04L 63/10* (2013.01); *H04L 65/1069* (2013.01); *H04L 67/125* (2013.01); *H04L 67/14* (2013.01); *H04L 67/34* (2013.01)

(56) References Cited

U.S. PATENT DOCUMENTS

2015/0074245 A1 3/2015 Ma et al.
2018/0013606 A1* 1/2018 Wang ..................... H04L 29/06

OTHER PUBLICATIONS

Blackford et al., "TR-069 CPE WAN Management Protocol", Jan. 8, 2014, pp. 1-228, XP055278927, URL: https://www.broadband-forum.org/technical/download/tr-069_Amendment-5.pdf.
The International Search Report from the International application No. PCT/FR2017/050532.

* cited by examiner

METHOD FOR ESTABLISHING A MANAGEMENT SESSION BETWEEN AN ITEM OF EQUIPMENT AND A DEVICE FOR MANAGEMENT OF THIS ITEM OF EQUIPMENT

BACKGROUND OF THE INVENTION

The invention relates to the general field of telecommunications.

It relates more particularly to managing equipment remotely, e.g. by a service provider.

In the context of the services they offer, service providers such as telecommunications operators equip their clients with specific pieces of equipment adapted to the services those clients require. By way of example, such equipment may comprise digital decoder units, also known as "set top boxes", that enable clients to use their terminals, in particular to access TV and video on-demand services, or they may comprise videophone terminals, or voice over Internet protocol (VoIP) terminals, etc. Such equipment installed on client premises is generally connected to a local network (e.g. a home local network or a business network). The local network is generally itself connected to the Internet via an access gateway to the Internet, also known as a residential gateway.

In order to optimize the quality of services offered to clients, a service provider generally manages and maintains the various pieces of equipment that it has placed with them. This management relies in particular on sending updating messages to the equipment, and also on receiving from the pieces of equipment information about their states.

In order to perform this remote administration, numerous service providers make use of the CPE WAN management protocol (CWMP), also know as TR-069, as published by the Broadband Forum in particular at the following address: http://www.broadband-forum.org/technical/download/TR-069_Amendment-5.pdf.

That protocol offers to a service provider via the use of an auto-configuration server (ACS) a set of services for managing pieces of equipment, comprising administrative services, monitoring services, performance tracking services, and diagnostic services, while satisfying requirements for security, extensibility, and independence from the manufacturers of the equipment.

The CWMP protocol is a protocol relying on the hypertext transport protocol (http) and on the simple object access protocol (SOAP). Orders are transmitted during sessions between a piece of equipment known as customer premises equipment (CPE) and the ACS server that manages it via the http or the HTTP Secure (https) protocol. These sessions are always initiated by the CPE. Nevertheless, a "connection request" mechanism for setting up a session is available in the protocol so as to enable the ACS server to set up a session in asynchronous manner with the piece of equipment. The main steps of that mechanism are summarized briefly in FIG. 1.

Figure 1:
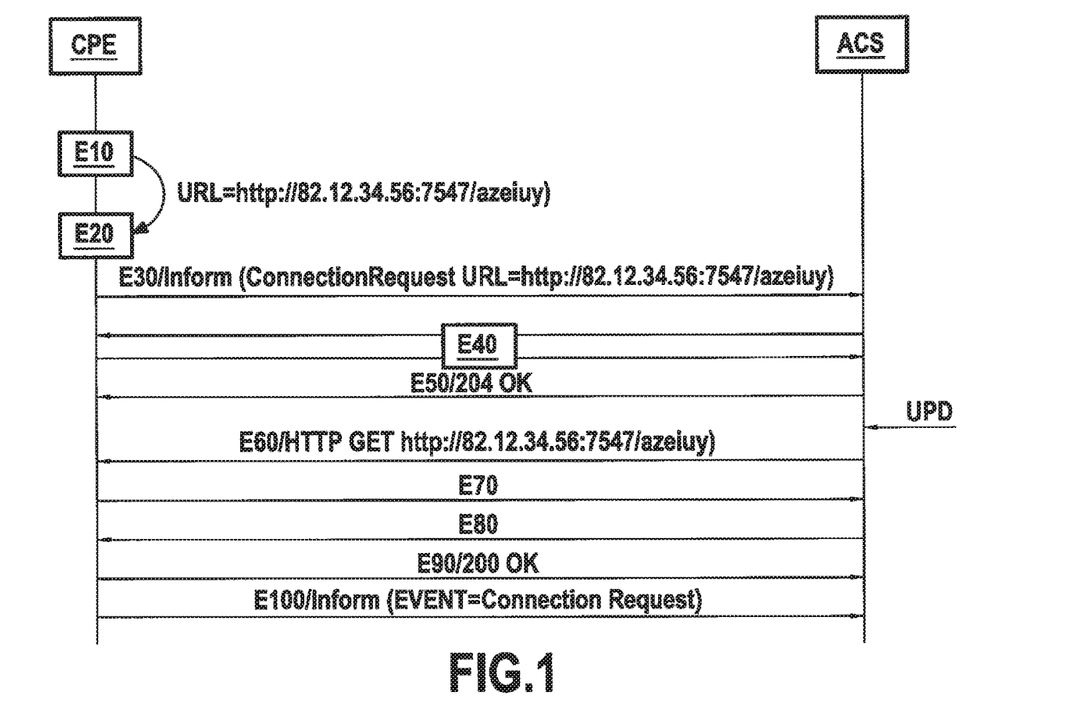
FIG. 1 briefly summarizes the steps of the "connection request" mechanism provided by the CWMP protocol (prior art)

In general, each time the CPE starts (step E10), it opens an http server at an address or uniform resource locator (URL) (step E20). The URL comprises the Internet protocol (IP) address of the CPE and the port on which it can be reached in the local network to which it belongs, in particular in order to perform a "connection request" procedure. For example:

URL=http://82.12.34.56:7547/azeiuy.

Thereafter, the CPE sends a CWMP Inform message to the ACS server to which it is attached and that serves to manage it, in other words to administer it (step E30). In this message, the CPE specifies its data model which includes in particular the URL of the http server opened in step E20 at which the ACS server can contact it. It should be observed that in the event of this URL changing, the CPE notifies the ACS server so that the ACS server always has an up-to-date URL available.

Dialog then takes place between the CPE and the ACS server in the session as set up in this way (step E40), which dialog is closed by a 204 OK message sent by the ACS server to the CPE (step E50).

It is now assumed that the service provider seeks to perform an updating operation on the CPE by means of the ACS server. The "connection request" mechanism provided by the CWMP protocol that makes this operation possible consists in sending an http GET request to the CPE at the URL supplied by the CPE (step E60). In known manner in the http protocol, the GET method serves to request a resource.

In response to the request from the ACS server, there follows authentication of the ACS server by the CPE (step E70), during which the ACS server provides an identifier and a password that have previously been shared between the CPE and the ACS server (step E80). A 200 OK message is sent by the CPE to the ACS server if authentication is successful (E90).

After this exchange, and following positive authentication of the ACS server, the CPE responds to the request from the ACS server to set up a management session by attempting to initiate a session therewith, and it sends an Inform message to the ACS server containing an event (E100)

Event=ConnectionRequest.

The ACS server can then administer the CPE remotely via the session as set up in this way and can request it to perform various actions by means of remote procedure call (RPC) commands in order to update it. For example, it may request it to download a configuration file, to return the value of one of its parameters, etc.

In other words, by means of that "connection request" mechanism, the ACS server requests a connection with the CPE, by visiting a URL supplied by the CPE and by being authenticated by the CPE. That mechanism therefore relies on the CPE being directly reachable by the ACS server via Internet protocol. It cannot be directly applied when the CPE is situated behind a network address translation (NAT) entity or behind a firewall serving to protect the local network to which the CPE belongs.

Appendix G of the CWMP protocol defines a mechanism that makes it possible to reach CPEs that are connected behind a NAT entity. That NAT traversal mechanism relies on the protocol known as "simple traversal of UDP through NATs" (STUN) and on the user datagram protocol (UDP). It provides for maintaining an open connection with a STUN server by sending periodic messages to that server, this connection then being used by the ACS server in order to administer the CPE.

Nevertheless, that mechanism requires the presence of a STUN client in the CPE and the presence of a STUN server in the service provider's ACS server, and the inventors have observed that this is implemented in very few CPEs in practice.

Furthermore, the mechanism relies on maintaining a permanent connection between the CPE and its ACS server, which can raise scaling problems at the server, in particular concerning the number of ports that are open in order to maintain such connections with all of the CPEs managed by the ACS server, if they are numerous, and in terms of the required bandwidth.

Document WO 2010/076488 proposes an alternative method for managing equipment remotely, relying on using an intermediate piece of equipment that provides the CPE's local network with security by blocking messages not requested by the CPE and received from an external network to which in particular the ACS server of the service provider belongs. Such an intermediate piece of equipment is typically a residential gateway providing the interface between the CPE's local network and the network of the ACS server.

In the method proposed in that document, if the residential gateway detects that a non-requested message sent to the CPE is a request to set up a management session containing an IP address, a port, and an RPC command to be executed by the CPE, it generates a second request to set up a management session, which it transmits to the CPE. In response to that second request, the CPE connects to its ACS server.

The solution proposed by Document WO 2010/076488 thus relies on necessarily adapting the residential gateway to use a specific RPC method so that it is capable of detecting a request to set up a management session that is being sent to the CPE from the external network, and so that it is itself capable of generating and transmitting a request to set up a management session to the CPE.

OBJECT AND SUMMARY OF THE INVENTION

The invention serves in particular to remedy the drawbacks of the above-mentioned prior art by proposing a set-up method for setting up a management session between a first piece of equipment that belongs to a first communications network and a first management device for managing the first piece of equipment that belongs to a second communications network distinct from the first communications network, the method comprising:

a set-up step for setting up a management session between a second piece of equipment of the first network that is reachable from the second network, and a second management device for managing the second piece of equipment that belongs to the second network;

a sending step of the second management device acting during the set-up management session to send a request to the second piece of equipment requesting the second piece of equipment to download a content at an address provided by the first piece of equipment in order to set up a management session with the first piece of equipment;

an execution step of the second piece of equipment executing the download request; and in response to this execution step, an initiation step of the first piece of equipment initiating a connection with the first management device in order to set up a management session between the first piece of equipment and the first management device.

Thus, in order to mitigate the non-reachability of the first piece of equipment by its management device (the "first" management device), the invention proposes using an intermediate piece of equipment that is reachable and that acts on the first piece of equipment, thereby serving to trigger the initiation of a connection between the first piece of equipment and its management device, thus enabling a management session to be set up between them. The intermediate piece of equipment, or "second" piece of equipment in the meaning of the invention, that acts specifically as a relay between the first piece of equipment and its management device may advantageously:

firstly be capable of reaching the first piece of equipment since it is to be found in the same local network as the first piece of equipment; and secondly, be reachable by its own ("second") management device using conventional mechanisms already provided in remote administration protocols, thereby enabling the second device to send it a command to access the first device via the connection address previously specified by the first device.

The command on which the invention relies for triggering the connection from the second piece of equipment to the first piece of equipment is a command to download content as implemented nowadays by all pieces of equipment that are designed to be remotely managed. By way of example, such a command is the download command specified in the CWMP protocol.

The invention thus proposes a mechanism that is very simple for setting up a management session with a piece of equipment that is not reachable, e.g. because it lies behind a NAT entity of the first network or behind a firewall protecting the first network and controlling access to the first network. This mechanism, which relies on making non-standard use of a standard download command referring to content, possibly dummy content (i.e. content that does not actually exist in the first piece of equipment), is completely transparent for the pieces of equipment in the first network since it relies on methods that are usually implemented by those pieces of equipment. The invention thus requires no modification proper of the first piece of equipment nor of the second piece of equipment that acts as a relay. This serves to reduce the cost of administering such pieces of equipment.

In addition, the invention applies to any type of equipment that can be administered remotely, and in particular to equipment that does not implement a particular NAT traversal mechanism or a firewall. This is particularly advantageous for the service provider or operator managing the equipment, not only in terms of cost but also in terms of environmental impact. It then suffices for a service provider to provide for only one piece of equipment in the first network to be reachable from the second network in which its own management device is located and which is under the control of the service provider, as is typically true for residential gateways (or access gateways) commonly used in home or business networks. In a variant, other pieces of equipment may be made reachable by the service provider, e.g. as a result of those pieces of equipment being adapted to perform a mechanism for traversing an address translation entity of the first network or a security device suitable for controlling access to the first network. By way of example, such mechanisms may be the mechanism specified in Appendix G of the CWMP protocol relying on the STUN protocol, or the mechanism specified in Appendix IV of the CWMP protocol relying on the UPnP Internet gateway device (IGD) protocol, or indeed the mechanism specified in Appendix K of the CWMP protocol relying on the extensible messaging and presence protocol (XMPP).

It should be observed that the invention applies equally well when the first and second pieces of equipment are managed by management devices that are distinct or by the same management device (i.e. the first management device and the second management device may be a single management device).

In a particular implementation, the request sent by the second management device to the second piece of equipment further includes authentication information for authentication with the first piece of equipment, this information being used by the second piece of equipment during the execution step.

This makes it possible to connect to the first piece of equipment when it is protected by authentication mechanism. This commonly applies for example when the CWMP protocol is used.

In another implementation, the set-up method further comprises an identification step for identifying the second piece of equipment to which the request is sent from information transmitted by the first piece of equipment.

The information for identifying the second piece of equipment may be obtained from the first piece of equipment via a procedure provided specifically for this purpose, or it may be deduced from messages exchanged between the first piece of equipment and its management device, e.g. when the first piece of equipment starts.

In another implementation, the method of the invention further comprises a prior detection step of detecting that the first piece of equipment is not directly reachable by the first management device, this detection step triggering performance of the step for establishing a management session between the second piece of equipment and the second management device, and sending by the second management device a request to the second piece of equipment.

Thus, in this implementation, the method of the invention is performed only when it is detected that the first piece of equipment cannot be reached, and otherwise a conventional procedure for setting up an asynchronous management session is performed between the first piece of equipment and its management device. As a result, the second piece of equipment and its management device are involved only when that is necessary and a direct connection between the first piece of equipment and its management device is not possible.

As mentioned above, the invention relies both on a second piece of equipment of the first network being reachable from the second network in which its own management device is located, and also on said management device for managing the second piece of equipment.

The invention thus also provides a management method for managing a piece of equipment, referred to as a "second" piece of equipment, that belongs to a first communications network, and that is reachable from a second communications network, the management method being for performing by a management device for managing the second piece of equipment, referred to as the "second" management device, and that belongs to the second network, the management method comprising:
  an obtaining step for obtaining an address supplied by a piece of equipment of the first network, referred to as the "first" piece of equipment, enabling a management session to be set up with the first piece of equipment;
  a set-up step for setting up a management session with the second piece of equipment; and
  a sending step for sending a request to the second piece of equipment during the management session that has been set up and requesting the second piece of equipment to download content at said address.

Correspondingly, the invention also provides a management device for managing a piece of equipment referred to as a "second" piece of equipment, that belongs to a first communications network, and that is reachable from a second communications network, said management device for managing the second piece of equipment belonging to the second network and comprising:
  an obtaining module configured to obtain an address supplied by a piece of equipment of the first network, referred to as the "first" piece of equipment, enabling a management session to be set up with the first piece of equipment;
  a set-up module configured to set up a management session with the second piece of equipment; and
  a sender module configured to send a request to the second piece of equipment during the management session that has been set up and requesting the second piece of equipment to download content at said address.

The management method and the management device benefit from the same advantages as those mentioned above for the method for setting up a management session.

In a particular implementation, the various steps of the management method are determined by computer program instructions.

Consequently, the invention also provides a computer program on a data medium, the program being suitable for being implemented in a management device or more generally in a computer, the program including instructions adapted to performing steps of a management method as described above.

The program may use any programming language and be in the form of source code, object code, or code intermediate between source code and object code, such as in a partially compiled form, or in any other desirable form.

The invention also provides a data or recording medium that is readable by a computer, and that includes instructions of a computer program as mentioned above.

The data or recording medium may be any entity or device capable of storing the program. For example, the medium may comprise storage means, such as a read only memory (ROM), e.g. a compact disk (CD) ROM, or a microelectronic circuit ROM, or indeed magnetic recording means, e.g. a floppy disk or a hard disk.

Furthermore, the data or recording medium may be a transmissible medium such as an electrical or optical signal, suitable for being conveyed via an electrical or optical cable, by radio, or by other means. The program of the invention may in particular be downloaded from an Internet type network.

Alternatively, the data or recording medium may be an integrated circuit in which the program is incorporated, the circuit being adapted to execute or to be used in the execution of the method in question.

In another aspect, the invention also provides a communications system comprising:
  a first piece of equipment that belongs to a first communications network;
  a first management device for managing the first piece of equipment that belongs to a second communications network distinct from the first network;
  a second piece of equipment that belongs to the first network and reachable from the second network; and
  a second management device for managing the second piece of equipment of the invention;
  the second piece of equipment comprising:
  a set-up module configured to set up a management session with the second management device;
  a receive module suitable for receiving a request from the management device during the management session that has been set up and requesting it to download dummy content at an address supplied by the first piece of equipment in order to set up a management session with the first piece of equipment; and an execution module suitable for executing the download request.

By way of example, the second piece of equipment is an access gateway of the first network giving the first network access to the second network (e.g. a residential gateway) or a piece of equipment of the first network performing a mechanism for traversing an address translation entity of the first network or a security device suitable for controlling access to the first network.

In other embodiments and implementations, it is also possible to envisage that the set-up method, the management method, the management device, and the communications system of the invention present in combination all or some of the above-specified characteristics.

BRIEF DESCRIPTION OF THE DRAWINGS

Other characteristics and advantages of the present invention appear from the following description made with reference to the accompanying drawings, which show an implementation having no limiting character. In the figures.

DETAILED DESCRIPTION OF THE INVENTION

Figure 2:
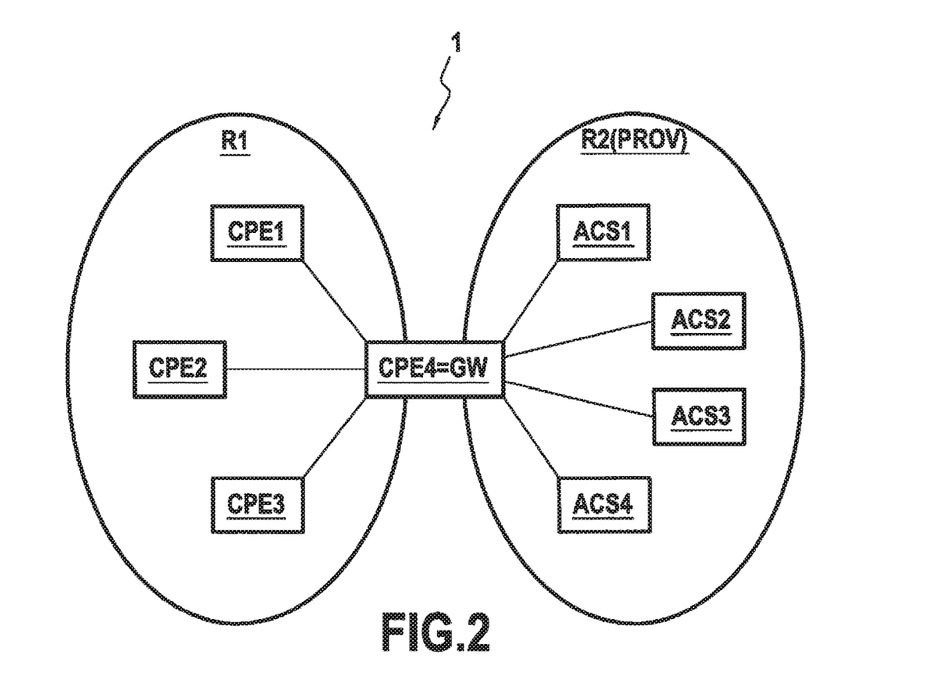
FIG. 2 is a diagram showing a communications system of the invention, in a particular embodiment.

FIG. 2 shows a particular embodiment of a communications system 1 in accordance with the invention in its environment.

The communications system 1 comprises a plurality of devices or pieces of equipment (CPE) that are connected to one another by a local communications network or business communications network R1. In the example shown in FIG. 2, the pieces of equipment in the network R1 comprise a voice over IP terminal CPE1, a videophone terminal CPE2, a digital decoder unit (set top box) CPE3, and a residential gateway CPE4 (also referred to as the access gateway of the network R1). The local network R1 is also a wireless local area network (WLAN).

Nevertheless, no limitation is associated with the number of the pieces of equipment in the network R1, nor with their natures, nor with the nature of the network. By way of example, it could be a wired local area network (LAN).

In the embodiment shown in FIG. 2, each of the pieces of equipment CPE1, CPE2, CPE3, and CPE4 is administered by a distinct management device in accordance with the invention, by using the CWMP or TR069 protocol. In other words, the piece of equipment CPE1 is managed by a management device or ACS server ACS1, the piece of equipment CPE2 is managed by a management device or ACS server ACS2, the piece of equipment CPE3 is managed by a management device or ACS server ACS3, and the piece of equipment CPE4 is managed by a management device or ACS server ACS4. Management of each piece of equipment by an ACS server comprises in particular updating software (e.g. firmware) in the equipment, monitoring its state and its performance, etc. It is assumed herein that all of the servers ACS1-ACS4 are administered by the same operator or service provider PROV and that they belong to a network R2 of the service provider that is distinct from the local network R1. By way of example, the network R2 is a wide area network (WAN), the Internet, etc.

In another embodiment, all of the pieces of equipment are managed by a single ACS server, or a plurality of pieces of equipment are managed by a common ACS server, etc.

The residential gateway CPE4 provides the interface between the local network R1 and the WAN network R2. In the presently-described equipment, it provides an address translation mechanism or NAT, in other words it serves to match IP addresses and ports of the local network R1 that are internal (private) and not routable (i.e. that cannot be reached by a piece of equipment that belongs to a network external to the local network R1) with a set of IP addresses that are external (public) and routable, i.e. in this example that can be reached from an external network, and typically from the network R2. Such a mechanism is itself known and is not described in greater detail herein.

Because the residential gateway CPE4 makes use of this address translation mechanism, the pieces of equipment CPE1, CPE2, and CPE3 that belong to the network R1 cannot be reached directly by some other device that does not belong to the network R1. In other words, those pieces of equipment are not directly reachable on their ports and IP addresses by their respective management devices ACS1, ACS2, and ACS3 (no IP reachability). It is also assumed that the pieces of equipment CPE1, CPE2, and CPE3 do not implement any particular mechanism for NAT traversing, such as for example the mechanism provided in Appendix G of the TR069 protocol.

It is assumed herein that the residential gateway CPE4, although forming part of the network R1, is in contrast reachable by devices of the network R2. Because of its interface function between the networks R1 and R2, it has a public IP address and a public port that are reachable by the devices in the network R2.

In order to enable the pieces of equipment CPE1, CPE2, CPE3 to be managed in spite of not having IP reachability, the communications system 1 is configured to perform a management method of the invention that relies in particular on the piece of equipment CPE4 (or residential gateway) that is reachable from the network R2, and on the management device or ACS server ACS4 of that piece of equipment CPE4.

Figure 3:
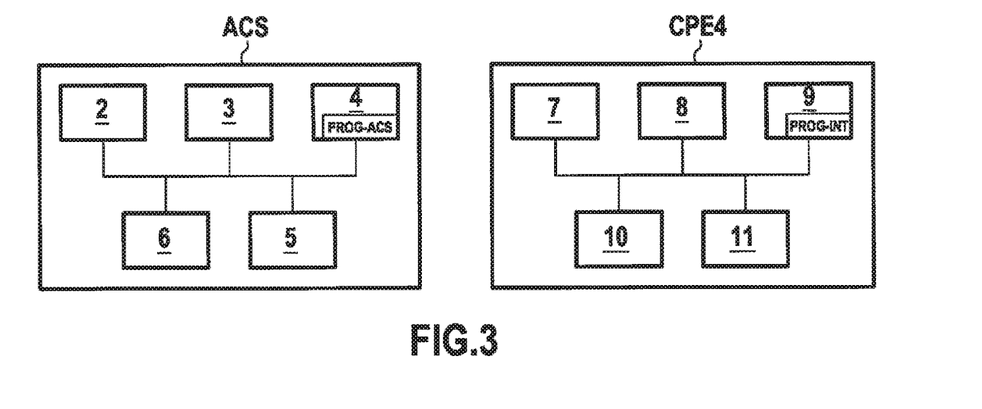
FIG. 3 is a diagram showing the hardware architectures both of a management device of the invention and of a piece of equipment of the communications system of FIG. 2.

In the presently-described embodiment, each ACS server of the network R2 has the hardware architecture of a computer. As shown in FIG. 3, it comprises in particular a processor 2, a random access memory (RAM) 3, a ROM 4, a non-volatile memory 5, and a communications module 6. The communications module 6 enables each ACS server to communicate with other pieces of equipment in the network R2 of the service provider (and in particular with the other ACS servers) and also with the pieces of equipment in the network R1 via the residential gateway CPE4, and in particular with the piece of equipment that it administers. By way of example, this module comprises a network card.

The ROM 4 of each ACS server constitutes a data medium in accordance with the invention that is readable by the processor 2 and that stores a computer program PROG-ACS in accordance with the invention including instructions for executing steps of a management method of the invention.

This computer program PROG-ACS defines in equivalent manner functional modules and software that are configured in this example to perform the steps of the management method of the invention. These functional modules rely on or control the hardware elements 2-6 of the ACS server. In this example they comprise in particular:

an obtaining module configured to obtain an address (URL) provided by a piece of equipment in the network R1 that is not directly reachable by its management device (e.g. CPE1, CPE2, or CPE3), and that enables a management session to be set up with that piece of equipment;

a set-up module configured to set up a management session with a "relay" piece of equipment of the network R1 that it administers and that it is capable of reaching directly (e.g. the gateway CPE4); and a sender module configured to send a request to the relay piece of equipment during a management session that has been set up, which request may use the http Download method implemented by all equipment that supports the CWMP protocol, and serves to request the relay equipment to download content at the address supplied by the non-reachable piece of equipment of the network R1.

These various modules serve in particular to control the communications module 6 of the ACS server. Their functions are described in greater detail below with reference to FIG. 4 and with reference to the steps of the method of the invention for setting up a management session.

Furthermore, in the presently-described embodiment, the piece of equipment (gateway) CPE4 also has the hardware architecture of a computer. As shown in FIG. 3, it comprises in particular a processor 7, a RAM 8, a ROM 9, a non-volatile memory 10, and a communications module 11. The communications module 11 enables the gateway CPE4 to communicate with the pieces of equipment of the network R2 of the service provider (and in particular with its management device ACS4) and also with the other pieces of equipment of the network R1 to which it belongs. By way of example, this module may comprise a network card together with a network address translation NAT entity, as mentioned above.

The ROM 9 of the piece of equipment CPE4 constitutes a data medium readable by the processor 7 and storing a computer program PROG-INT defining various functional and software modules that rely on or control the hardware elements 7-11 of the piece of equipment CPE4. In this example, these modules comprise in particular:

a set-up module configured to set up a management session with the management device ACS4 of the piece of equipment CPE4;

a receive module suitable for receiving a request from the management device ACS4 during the management session when set up, which request may use the http Download method that is implemented by all equipment supporting the CWMP protocol, and serves to request the piece of equipment CPE4 to download content at an address (URL) supplied by a non-reachable piece of equipment of the network R1 (e.g. CPE1, CPE2, or CPE3) in order to set up a management session with that piece of equipment; and an execution module suitable for executing the download request.

The set-up, receive, and sender modules of the piece of equipment CPE4 act in particular to control the communications module 11 of the piece of equipment CPE4. Their functions are described in greater detail below with reference to the steps of the method of the invention for setting up a management session.

Figure 4:
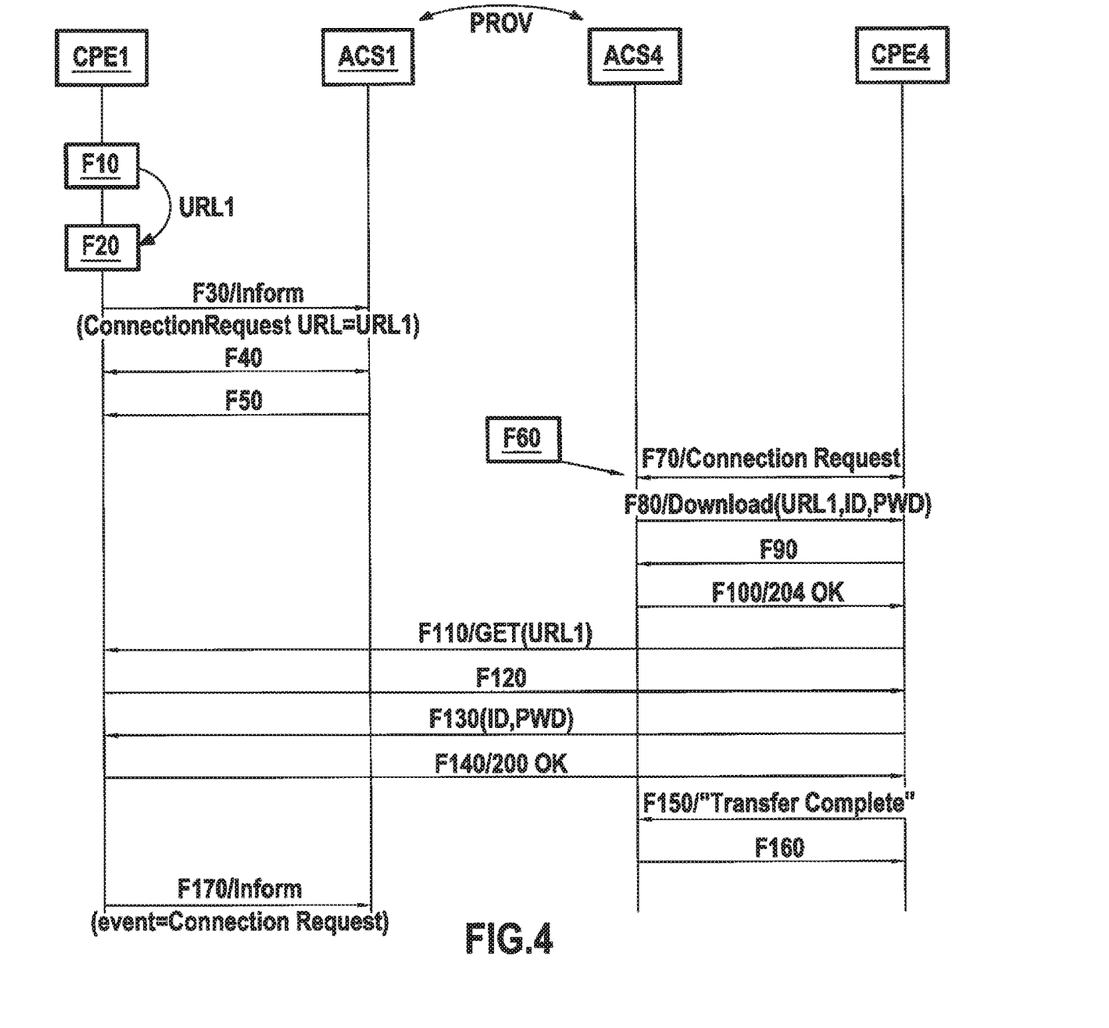
FIG. 4 shows the main steps of a set-up method of the invention in a particular implementation in which it is performed by the FIG. 2 communications system.

With reference to FIG. 4, there follows a description in greater detail of the main steps of a method of the invention for setting up a management session. By way of illustration, in the example shown in FIG. 4, attention is given to setting up a management session between the piece of equipment CPE1 of the network R1 and its management device or ACS server ACS1. Nevertheless, this assumption is not limiting in any way, and the set-up method of the invention is equally applicable to any of the pieces of equipment of the network R1 that cannot be reached directly by their own management devices (in other words, in the example shown in FIG. 2, likewise to the pieces of equipment CPE2 and CPE3).

In the presently-described implementation, the method of the invention for setting up a management session is preceded by a "conventional" preliminary stage of setting up a session between the piece of equipment CPE1 and its management device ACS1, which stage takes place when the piece of equipment CPE1 starts. This preliminary stage is similar to that described above with reference to FIG. 1.

Thus, when the piece of equipment CPE1 starts (step F10), it opens an http server at an address URL1 (step F20). In this example, the server is protected by an identifier ID and by a password PWD that are shared with the management device ACS1. No limitation is associated with the way in which this sharing is undertaken (identifier and password hard-coded in both devices, secure exchange, etc.). The address URL1 is a URL comprising the IP address of the pieces of equipment CPE1 and the port on which it can be reached in the local network R1, after authentication based on the identifier ID and on the password PWD. By way of example, the address URL1 is http://192.168.1.12:7547/azeiuy.

Thereafter, the piece of equipment CPE1 sends a CWMP Inform message to its management device ACS1 (step F30) in which it specifies its data model and in particular the address URL1 of the http server opened in the network R1 in the step F20 and on which the management device ACS1 can contact it.

Dialog then follows between the piece of equipment CPE1 and its management device ACS1 in the session that has been set up in this way.

During this dialog, in the presently-described implementation, the management device ACS1 obtains information from the piece of equipment CPE1 about the residential gateway CPE4 that provides the interface between the local network R1 and the network R2 of the management device ACS1 (step F40). This information is to serve in particular to enable the management device ACS1 to identify the residential gateway CPE4. The management device ACS1 obtains this information from the piece of equipment CPE1, e.g. by performing a procedure as defined in Appendix F of the CWMP protocol and set out in the detail in the document entitled "TR-069: CPE WAN management protocol v1.4", Nov. 2013 (referred to below as document D1), that is available at the address: http://www.broadband-forum.org/technical/download/TR-069 Amendment-5.pdf. This procedure relies on using a "GatewayInfo" method.

In a variant, if the piece of equipment CPE1 and/or the management device ACS1 do not implement Appendix F of the CWMP protocol, the management device ACS1 can detect the identity of the residential gateway CPE4 from the Inform message that it receives in step F30 from the piece of equipment CPE1. This message does indeed pass through the gateway CPE4, so the management device ACS1 can identify therefrom a reachability address (public IP address and public port) of the gateway CPE4.

In yet another variant, it may detect that it is receiving messages from the piece of equipment CPE1 coming from the same IP address as another CPE that it manages and for which it knows the gateway with which the piece of equipment is associated.

It should be observed that the management device ACS1 or the service provider PROV administering the management device ACS1 can make use of information collected from the gateway CPE4 and of transport addresses contained in messages exchanged with the piece of equipment CPE1 to detect that the residential gateway CPE4 performs a network address translation NAT mechanism, and due to the existence of this mechanism, to detect that the piece of equipment CPE1 is not directly reachable by its management device ACS1 on its address URL1. It is emphasized at this point that this prior detection step triggers the performance of steps as described below both for setting up a management session between the gateway CPE4 and its management device ACS4 and also for the management device ACS4 sending a request to the gateway CPE4.

The communications session between the piece of equipment CPE1 and the management device ACS1 then closes with a 204 OK message sent by the management device ACS1 to the piece of equipment CPE1 (step F50).

It is now assumed that the service provider PROV seeks to perform an intervention on the piece of equipment CPE1, e.g. by communicating or updating firmware (step F60). Since the piece of equipment CPE1 is not directly reachable at its address URL1, the management device ACS1 cannot have recourse to a conventional "connection request" procedure as provided for by the CWMP protocol in order to set up an asynchronous management session with the piece of equipment CPE1. The intervention desired by the service provider PROV therefore triggers the execution of the set-up method of the invention.

In this example, this method relies on the piece of equipment CPE4 and on the management device ACS4. More precisely, in accordance with the invention, it consists in benefiting from the piece of equipment CPE4 being reachable by its management device ACS4 because of its gateway function between the networks R1 and R2, and from the piece of equipment CPE1 being reachable by the piece of equipment CPE4 in order to trigger connection between the piece of equipment CPE1 and its management device ACS1. In other words, in this example, the piece of equipment CPE4 acts as a relay between the piece of equipment CPE1 and its management device ACS1 in order to set up an asynchronous management session between them. The set-up method of the invention thus relies for this purpose on the management method of the invention being performed by the management device ACS4 and on the corresponding response of the piece of equipment CPE4.

More particularly, after step F60, the management device ACS4 (e.g. activated by a message from the management device ACS1 or directly by the service provider PROV) performs a procedure for setting up a management session with the piece of equipment CPE4 (step F70). For this purpose, it proceeds in accordance with the "connection request" procedure described in above-mentioned document D1 that describes the CWMP protocol and that is summarized briefly above with reference to FIG. 1. Setting up this management session does not present any difficulty since the piece of equipment CPE4 is directly reachable by its management device ACS4.

Once the management session has been set up between the piece of equipment CPE4 and its management device ACS4, the management device ACS4 sends a request to the piece of equipment CPE4 requesting it to download content at the address URL1 as previously supplied to the management device ACS1 by the piece of equipment CPE1 (step F80). The address URL1 was previously obtained by the management device ACS4, either directly from the management device ACS1, or else via the service provider PROV. Furthermore, it is also assumed in this example that when the address URL1 was supplied, the management device ACS4 also obtained the identifier ID and the password PWD required to authenticate itself with the piece of equipment CPE1.

In the presently-described embodiment, the request sent by the management device ACS4 relies advantageously on the RPC Download method. This method is performed by all equipment in compliance with the CWMP protocol. It is conventionally used by an ACS server to request a piece of equipment that it administers to download multimedia content or a specific updating file and/or a configuration file. Such a method is described in detail in paragraph A.3.2.8 of Appendix A of document D1.

The Download method takes various arguments or parameters as input, namely:

a command key "CommandKey", which is a character string that the piece of equipment uses to refer to a particular download, in particular when it confirms that downloading has been executed;

a file type "FileType", represented by an integer followed by a space followed by a description of the file type. Only five values are defined by the CWMP protocol in document D1:
"1: Firmware Update Image";
"2: Web Content";
"3: Vendor Configuration File";
"4: Tone File"; and
"5: Ringer File";

an address "URL" specifying the location of the content to be downloaded;

a user name "Username" used by the equipment to authenticate itself with the server from which it is to download the content. If no authentication is required, this field is left empty;

a password "Password" used by the equipment to authenticate itself with the server from which it is to download the content. If no authentication is required, this field is left empty; and a delay "DelaySeconds" expressed in seconds and specifying the delay between receiving the download request and the piece of equipment executing the download.

It is emphasized at this point that other file type values may also be used in certain CPEs.

In the presently-envisaged example, the Download request sent by the management device ACS4 to the piece of equipment CPE4 contains the following parameters:

"CommandKey" set to an arbitrary value selected by the management device ACS4;

"FileType" set to a value that is accepted by the equipment CPE4;

"URL" set to the value URL1;

the authentication information "UserName" and "Password" set respectively to the identifier ID and to the password PWD; and "DelaySeconds" set to 0 for immediate execution. Nevertheless, it should be observed that other values are possible, preferably small values, in order to ensure that the downloading is executed quickly by the gateway CPE4.

In a variant, if the server opened by the piece of equipment CPE1 during the step E20 is not protected by an identifier and a password, the fields "Username" and "Password" are left empty.

It should be observed that the Download request sent by the management device ACS4 may specify content that does not have any genuine need to exist in the piece of equipment CPE1, in other words this request may relate to downloading content that may be referred to as "dummy" content. The idea is that merely by the piece of equipment CPE4 executing the download on receiving this request, a connection is triggered between the piece of equipment CPE1 to its management device ACS1.

The piece of equipment CPE4 receives the Download request sent by its management device ACS4 and acknowledges receipt of the request (step F90). When the management device ACS4 has no more operations to perform with the piece of equipment CPE4, it sends a 204 OK message to the piece of equipment CPE4, thereby closing the previously set-up management session (step F100).

On receiving the Download request, the piece of equipment CPE4 executes the download requested by the management device ACS4 while using the parameters specified in the request (step F110). In this example, this execution is immediate since the delay specified in the "DelaySeconds" parameter of the request was set at 0 s.

This execution is performed by the piece of equipment CPE4 sending an http Get download request to the piece of equipment CPE1 to which the address URL1 refers, the http Get request targetting the address URL1. It should be observed that since the piece of equipment CPE1 and the piece of equipment CPE4 belong to the same local network R1, the piece of equipment CPE4 has no difficulty in reaching the piece of equipment CPE1 (typically there is no NAT to be traversed within the network R1, such that all of the pieces of equipment are reachable by all of the other pieces of equipment that belong to the network).

In the presently-described implementation, reception by the piece of equipment CPE1 of the GET request triggers a procedure for authenticating the piece of equipment CPE4 (step F120), during which the piece of equipment CPE4 provides the piece of equipment CPE1 with the required authentication information, namely the identifier ID and the password PWD received from the management device ACS4 in the Download request (step F130).

Once authentication of the equipment CPE4 has been successfully achieved, the piece of equipment CPE1 sends a 200 OK message to the piece of equipment CPE4 (step F140).

It should be observed that if the content specified in the Download request does not exist properly speaking in the piece of equipment CPE1, then during the step F140, the piece of equipment CPE1 does not provide any content to the piece of equipment CPE4, in other words, the piece of equipment CPE4 downloads empty content, such that from its point of view, the execution of the download may be considered as having failed.

On receiving the 200 OK message from the piece of equipment CPE1, the piece of equipment CPE4 sends a "Transfer Complete" confirmation to its management device ACS4 confirming that the downloading has been executed (step F150). By way of example, this confirmation may specify that the downloading failed.

Furthermore, in compliance with the mode of operation of equipment implementing the CWMD protocol, the Get request sent by the piece of equipment CPE1 to the address URL1 triggers in response the piece of equipment CPE1 initiating a connection with its own management device ACS1 in order to set up a management session between them (step F170). For this purpose, the piece of equipment CPE1 sends specifically an Inform message to its management device ACS1 containing the event EVENT=ConnectRequest.

As a result of this connection being initiated, a management session is set up between the piece of equipment CPE1 and the management device ACS1, enabling it to perform the updating or other operations as desired by the service provider PROV.

It should be observed that in the presently-described implementation, all the pieces of equipment CPE1-CPE4 of the network R1 are managed by distinct management devices ACS1-ACS4. Nevertheless, in another implementation, it is possible to envisage that a common management device manages a plurality of pieces of equipment simultaneously. For example, it is possible to envisage that a common management device manages both the piece of equipment CPE1 and also the piece of equipment CPE4, thereby facilitating access to the information required for performing the invention (URL of the piece of equipment CPE1, authentication information, etc.).

Furthermore, in the presently-described implementation, the pieces of equipment CPE1, CPE2, and CPE3 are not reachable by their respective management devices because of the presence of an address translation device in the gateway CPE4 and they do not themselves implement a NAT traversal mechanism. Nevertheless, these assumptions are not limiting, and the invention may be applied in other contexts in which these pieces of equipment are not reachable. For example, the gateway CPE4 may incorporate a security device that limits access to the network R1, such as a firewall device that is suitable for blocking access to the network R1 in particular for messages that have not been requested by the pieces of equipment in this network. In another example, the pieces of equipment CPE1, CPE2, and CPE3 may implement these NAT traversal mechanisms, while the gateway CPE4 does not implement such a mechanism.

In the presently-described implementation, the set-up method of the invention relies on the gateway CPE4 and on its management device ACS4, since, because of its function, the gateway CPE4 is reachable from the network R2 in which the management device ACS4 is located. Nevertheless, the invention may be performed from a piece of equipment of the network R1 other than the gateway CPE4 (and the management device administering that piece of equipment) providing that other piece of equipment is reachable from the network R2. In particular, the invention may be implemented using the piece of equipment CPE2 for example, supposing that it performs a NAT traversal mechanism such as that proposed in Appendix F of document D1 describing the CWMP protocol, or such as the solution proposed in the UPnP Internet gateway device (IGD) protocol or in the extensible messaging and presence protocols (XMPP) protocols that are known in the prior art.

This alternative implementation may be particularly advantageous when, for various reasons, the access gateway CPE4 is not reachable from the network R2. By way of example, it might be controlled by an operator other than the operator of the network R2, or there may be a NAT entity between the gateway CPE4 and its management device ACS4 (also referred to as a carrier-grade NAT (CGN)). Such a configuration is sometimes used nowadays when the network uses an IPv4 addressing mode and when there are not enough addresses.

It should also be observed that the invention is described with reference to the CWMP protocol. Nevertheless, it applies equally well to other protocols for remotely managing equipment and that operate in similar manner to CWMP (sessions set up at the initiative of pieces of equipment, publication of a connection address for triggering a connection from a piece of equipment to its administration server, etc.) and in particular proprietary protocols. The invention has a preferred application in protocols that rely on the http protocol and that already define methods of the Download or Get type such as those used by the CWMP protocol.

The invention claimed is:

1. A set-up method for setting up a management session between a first piece of equipment that belongs to a first communications network and a first management device for managing the first piece of equipment that belongs to a second communications network distinct from the first communications network, the method comprising:
   a set-up step for setting up a management session between a second piece of equipment of the first network that is reachable from the second network, and a second management device managing the second piece of equipment that belongs to the second network;
   a sending step of the second management device acting during the set-up management session to send a request to the second piece of equipment requesting the second piece of equipment to download a content at an universal resource locator (URL) address provided by the first piece of equipment to the first management device in order to set up a management session with the first piece of equipment, wherein the content is one or more of a dummy content, multimedia content, updating file and a configuration file and further wherein the universal resource locator (URL) address is obtained by the second management device from the first management device and then provided to the second piece of equipment;
   an execution step of the second piece of equipment executing the download request; and
   in response to this execution step, an initiation step of the first piece of equipment initiating a connection with the first management device in order to set up a management session between the first piece of equipment and the first management device.

2. A set-up method according to claim 1, wherein the request sent by the second management device to the second piece of equipment further includes authentication information for authentication with the first piece of equipment, this information being used by the second piece of equipment during the execution step.

3. A set-up method according to claim 1, wherein the first management device and the second management device are a single management device.

4. A set-up method according to claim 1, further comprising an identification step for identifying the second piece of equipment to which the request is sent from information transmitted by the first piece of equipment.

5. A set-up method according to claim 1, further comprising a prior detection step for detecting that the first piece of equipment is not directly reachable by the first management device, this detection step triggering performance of the step for establishing a management session between the second piece of equipment and the second management device, and for the second management device sending a request to the second piece of equipment.

6. A management method for managing a second piece of equipment, that belongs to a first communications network, and that is reachable from a second communications network, the management method being for performing by a second management device managing the second piece of equipment, and that belongs to the second network, the management method comprising:
   obtaining by the second management device from a first management device of the second network, an universal resource locator (URL) address supplied by a first piece of equipment of the first network, enabling a management session to be set up with the first piece of equipment;
   setting up a management session by the second management device with the second piece of equipment;
   providing the universal resource locator (URL) address from the second management device to the second piece of equipment; and
   sending a request by the second management device to the second piece of equipment during the management session that has been set up and requesting the second piece of equipment to download content at said universal resource locator (URL) address, wherein the content is one or more of a dummy content, multimedia content, updating file and a configuration file.

7. A computer readable non-transitory data medium storing a computer program including instructions for executing steps of a management method when said computer program is loaded into a memory of a computer and executed by the computer, the management method for managing a second piece of equipment, that belongs to a first communications network, and that is reachable from a second communications network, the management method being for performing by a second management device managing the second piece of equipment, and that belongs to the second network, the management method comprising:
   obtaining by the second management device from a first management device of the second network, an Universal Resource Locator (URL) address supplied by a first piece of equipment of the first network, enabling a management session to be set up with the first piece of equipment;
   setting up a management session by the second management device with the second piece of equipment;
   providing the universal resource locator (URL) address from the second management device to the second piece of equipment; and
   sending a request by the second management device to the second piece of equipment during the management session that has been set up and requesting the second piece of equipment to download content at said universal resource locator (URL) address, wherein the content is one or more of a dummy content, multimedia content, updating file and a configuration file.

8. A management device for managing a second piece of equipment that belongs to a first communications network, and that is reachable from a second communications network, said management device for managing the second piece of equipment that belongs to the second network and comprising:
   a memory storing a computer program;
   a processor coupled to the memory to run the computer program; and
   a communications module coupled to the processor to communicate with the second piece of equipment and a first piece of equipment through a first management device;
   wherein the processor running the computer program causes the communications module:

to obtain from a first management device of the first network, an Universal Resource Locator (URL) address supplied by the first piece of equipment of the first network, enabling a management session to be set up with the first piece of equipment;

to set up a management session with the second piece of equipment;

to provide the universal resource locator (URL) address to the second piece of equipment; and to send a request to the second piece of equipment during the management session that has been set up and requesting the second piece of equipment to download content at said universal resource locator (URL) address, wherein the content is one or more of a dummy content, multimedia content, updating file and a configuration file.

9. A communications system comprising:

a first piece of equipment that belongs to a first communications network;

a first management device for managing the first piece of equipment that belongs to a second communications network distinct from the first network;

a second piece of equipment that belongs to the first network and reachable from the second network; and a second management device for managing the second piece of equipment, the second management device comprising:

a memory storing a computer program;

a processor coupled to the memory to run the computer program; and a communications module coupled to the processor to communicate with the second piece of equipment and a first piece of equipment through a first management device;

wherein the processor running the computer program causes the communications module:

to obtain from the first management device an Universal Resource Locator (URL) address supplied by the first piece of equipment of the first network, enabling a management session to be set up with the first piece of equipment;

to set up a management session with the second piece of equipment; and to send a request to the second piece of equipment during the management session that has been set up and requesting the second piece of equipment to download content at said universal resource locator (URL) address, wherein the content is one or more of a dummy content, multimedia content, updating file and a configuration file;

said second piece of equipment comprising:

a set-up module configured to set up a management session with the second management device;

a receive module suitable for receiving a request from the second management device during the management session that has been set up and requesting it to download dummy content at an universal resource locator (URL) address supplied by the first piece of equipment in order to set up a management session with the first piece of equipment, wherein the universal resource locator (URL) address is provided from the first piece of equipment to the first management device and then from the first management device to the second management device;

an execution module suitable for executing the download request;

wherein the second piece of equipment executes the download request; and wherein, in response to execution of the download request, the first piece of equipment initiates a connection with the first management device in order to set up the management session between the first piece of equipment and the first management device.

10. A communications system according to claim 9, wherein the second piece of equipment is an access gateway of the first network or a piece of equipment of the first network performing a mechanism for traversing an address translation entity of the first network or a security device suitable for controlling access to the first network.

* * * * *